US005706464A

United States Patent [19]
Moore et al.

[11] Patent Number: 5,706,464
[45] Date of Patent: Jan. 6, 1998

[54] METHOD AND SYSTEM FOR ACHIEVING ATOMIC MEMORY REFERENCES IN A MULTILEVEL CACHE DATA PROCESSING SYSTEM

[75] Inventors: Charles Roberts Moore; John Stephen Muhich; Robert James Reese, all of Austin, Tex.

[73] Assignee: International Business Machines Corporation, Armonk, N.Y.

[21] Appl. No.: 608,978

[22] Filed: Feb. 29, 1996

Related U.S. Application Data

[63] Continuation of Ser. No. 10,968, Jan. 29, 1993, abandoned.
[51] Int. Cl.[6] .................... G06F 12/12; G06F 12/08
[52] U.S. Cl. .............. 395/449; 395/482; 395/473; 395/472; 395/462; 395/471; 395/463
[58] Field of Search ........................... 395/472, 473, 395/482, 451, 449, 479, 471, 463

[56] References Cited

U.S. PATENT DOCUMENTS

| 5,136,700 | 8/1992 | Thacker | 395/449 |
| 5,237,694 | 8/1993 | Horne et al. | 395/726 |
| 5,355,467 | 10/1994 | MacWilliams et al. | 395/473 |
| 5,369,753 | 11/1994 | Tipley | 395/449 |
| 5,404,482 | 4/1995 | Stamm et al. | 395/472 |
| 5,574,922 | 11/1996 | James | 395/561 |

FOREIGN PATENT DOCUMENTS

| 0 434 250 | 6/1991 | European Pat. Off. . |
| 0 481 233 | 4/1992 | European Pat. Off. . |

OTHER PUBLICATIONS

"Handling Reservations in Multiple-Level Cache", IBM Technical Disclosure Bulletin, vol. 36, No. 12, Dec. 1993; pp. 441–445, Dec. 1993.

Slater, Michael. "A Guide to RISC Microprocessors", Academic Press, Inc., 1992, pp. 151–153, 1992.
Michael Slater and Brian Case, "MIPS R4000 Sets Performance Record", Oct. 2, 1991, pp. 6–11, 16.
Michael Slater, "MIPS Previews 64-Bit R4000 Architecture", Feb. 6, 1991, pp. 5–9, 18.
"Alpha Architecture Handbook", Feb. 1992, pp. 4–8 –4–12.

*Primary Examiner*—Eddie P. Chan
*Assistant Examiner*—Reginald G. Bragdon
*Attorney, Agent, or Firm*—Michael A. Davis, Jr.; Andrew J. Dillon

[57] ABSTRACT

Atomic memory references require a data processing system to present the appearance of a coherent memory system, which may be achieved in most multiprocessor systems by means of normal memory coherency systems. Writes or attempted writes to memory must be monitored by a processor in order to correctly resolve hits against the reservation state. In a two level cache system the second level cache filters bus operations and forwards to the processor any bus traffic that may involve data stored within the first level cache. This may be accomplished by enforcing an "inclusion" property wherein all data entries within the first level cache are required to be maintained within higher level caches. A problem arises when a block within a first level cache which has had a reservation pending is cast out and the second level cache no longer forwards bus traffic to the associated processor, despite the continued pendency of the reservation. This problem is avoided by setting a reservation flag each time a valid reservation is pending. Thereafter, any replacement of a data entry in a higher level cache results in the automatic deletion of the corresponding data entry within any included level of cache. The reservation flag is then reset in response to the occurrence of either a bus operation which affects the reservation address or the deletion of the cache data entry corresponding to the reservation address, permitting atomic memory references to be achieved without the necessity of distributing the reservation address.

6 Claims, 6 Drawing Sheets

METHOD AND SYSTEM FOR ACHIEVING ATOMIC MEMORY REFERENCES IN A MULTILEVEL CACHE DATA PROCESSING SYSTEM

This is a continuation of application Ser. No. 08/010,968, filed 29 Jan. 1993, now abandoned.

BACKGROUND OF THE INVENTION

1. Technical Field

The present invention relates in general to an improved data processing system and in particular to a method and system for achieving an atomic memory reference in a multilevel cache data processing system. Still more particularly, the present invention relates to a method and system for achieving an atomic memory reference in a multilevel cache multiprocessor data processing system without requiring distribution of the reservation address throughout the cache system.

2. Description of the Related Art

Designers of modern state-of-the-art data processing systems are continually attempting to enhance the performance aspects of such systems. One technique for enhancing data processing system efficiency is the achievement of short cycle times and a low Cycles-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a multiscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In such systems a significant pipeline delay penalty may result from the execution of conditional branch instructions. Conditional branch instructions are instructions which dictate the taking of a specified conditional branch within a application in response to a selected outcome of the processing of one or more other instructions. Thus, by the time a conditional branch instruction propagates through a pipeline queue to an execution position within the queue, it will have been necessary to load instructions into the queue behind the conditional branch instruction prior to resolving the conditional branch in order to avoid run-time delays.

Another source of delays within multiscalar processor systems is the fact that such systems typically execute multiple tasks simultaneously. Each of these multiple tasks typically has a effective or virtual address space which is utilized for execution of that task. Locations within such a effective or virtual address space include addresses which "map" to a real address within system memory. It is not uncommon for a single space within real memory to map to multiple effective or virtual memory addresses within a multiscalar processor system. The utilization of effective or virtual addresses by each of the multiple tasks creates additional delays within a multiscalar processor system due to the necessity of translating these addresses into real addresses within system memory, so that the appropriate instruction or data may be retrieved from memory and placed within an instruction queue for dispatching to one of the multiple independent functional units which make up the multiscalar processor system.

One technique whereby effective or virtual memory addresses within a multiscalar processor system may be rapidly translated to real memory addresses within system memory is the utilization of a so-called "translation lookaside buffer" (TLB). A translation lookaside buffer (TLB) is a buffer which contains translation relationships between effective or virtual memory addresses and real memory addresses which have been generated utilizing a translation algorithm. While the utilization of translation lookaside buffer (TLB) devices provides a reasonably efficient method for translating addresses, the utilization of such buffers in tightly coupled symmetric multiprocessor systems causes a problem in coherency. In data processing systems in which multiple processors may read from and write to a common system real memory care must be taken to ensure that the memory system operates in a coherent manner. That is, the memory system is not permitted to become incoherent as a result of the operations of multiple processors. Each processor within such a multiprocessor data processing system typically includes a translation lookaside buffer (TLB) for address translation and the shared aspect of memory within such systems requires that changes to a single translation lookaside buffer (TLB) within one processor in a multiprocessor system be carefully and consistently mapped into each translation lookaside buffer (TLB) within each processor within the multiprocessor computer system in order to maintain coherency.

The maintenance of translation lookaside buffer (TLB) coherency in prior art multiprocessor systems is typically accomplished utilizing interprocessor interrupts and software synchronization for all translation lookaside buffer (TLB) modifications. These approaches can be utilized to ensure coherency throughout the multiprocessor system; however, the necessity of utilizing interrupts and software synchronization results in a substantial performance degradation within a multiprocessor computer system.

Additionally, each processor within a multiprocessor data processing system typically includes a small specialized memory or "cache" which is preferably utilized to access data or instructions within system memory in a manner well known to those having skill in the art. The sizing and utilization of cache memory systems is a well known subspecialty within the data processing art and is not addressed within the present application. However, those skilled in the art will appreciate that by utilizing modern associative cache techniques, a large percentage of memory accesses within a system may be achieved utilizing data which is temporarily stored within a cache/memory interface.

One problem which occurs in multiprocessor systems wherein memory is distributed into smaller caches is that certain cache operations force a processor to flush and/or invalidate a block of data within its associated cache. In a single processor environment this is a relatively straightforward operation since the block of data may exist within only one of two places. That is, either within the cache or within main memory. However, in a multiprocessor environment these functions are complicated by the fact that other processors may have the same block of data within an associated cache and that block of data may be unaltered or altered. Thus, to ensure that cache operations within a multiprocessor environment are performed such that data integrity and coherency are maintained a multiprocessor system must provide a technique whereby synchronization may be accomplished throughout all processor caches and main memory within such a system.

An additional coherency problem exists in multiprocessor systems which include multiple levels of cache when an atomic memory reference must be achieved. An "atomic" memory reference is a reference in which data is loaded from memory and a reservation is established for the data address. After the data has been manipulated or updated the data is then stored to the reserved address. This is generally accomplished by utilizing specific commands such as a "Load and Reserve" (LARX) instruction which loads the data and sets a reservation for that address. A "Store Conditional" (STCX) instruction is then utilized to store the updated data to the reserved address if the reservation is still set and only complete the store under that condition. Intervening attempted writes to the reservation address will reset the reservation and thus the operations of other processors which may affect that address must be monitored. This is generally accomplished in a multilevel cache system by enforcing "inclusion" between related cache memories and thereafter filtering bus traffic to communicate to a processor those activities which may write to the reservation address.

It should therefore be apparent that a need exists for a method and system for achieving an atomic memory reference in a multilevel cache system which can maintain the state of a reservation despite the casting out of an associated data block from the cache system during the pendency of the reservation.

SUMMARY OF THE INVENTION

It is therefore one object of the present invention to provide an improved data processing system.

It is another object of the present invention to provide an improved method and system for achieving an atomic memory reference in a multilevel cache data processing system.

It is yet another object of the present invention to provide an improved method and system for achieving an atomic memory reference in a multilevel cache multiprocessor data processing system without requiring distribution of the reservation address throughout the cache system.

The foregoing objects are achieved as now described. The method and system of the present invention may be utilized to achieve an atomic memory reference in a multilevel cache data processing system. Atomic memory references require the system to present the appearance of a coherent memory system, which may be achieved in most multiprocessor systems by means of normal memory coherency systems. Writes or attempted writes to memory must be monitored by a processor in order to correctly resolve hits against the reservation state. Multilevel cache systems present special problems of coherency which may result in improper operation of the reservation mechanism. For example, in a two level cache system the second level cache filters bus operations and forwards to the processor any bus traffic that may involve data stored within the first level cache. This may be accomplished by enforcing an "inclusion" property wherein all data entries within the first level cache are required to be maintained within higher level caches. The problem arises when a block within a first level cache which has had a reservation pending is cast out and the second level cache no longer forwards bus traffic to the associated processor, despite the continued pendency of the reservation. In accordance with the disclosed method, a reservation flag is set each time a valid reservation is pending. Thereafter, any replacement of a data entry in a higher level cache results in the deletion of the corresponding data entry within any included level of cache. The reservation flag is then reset in response to the occurrence of either a bus operation which affects the reservation address or the deletion of the cache data entry corresponding to the reservation address, permitting atomic memory references to be achieved without the necessity of distributing the reservation address.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
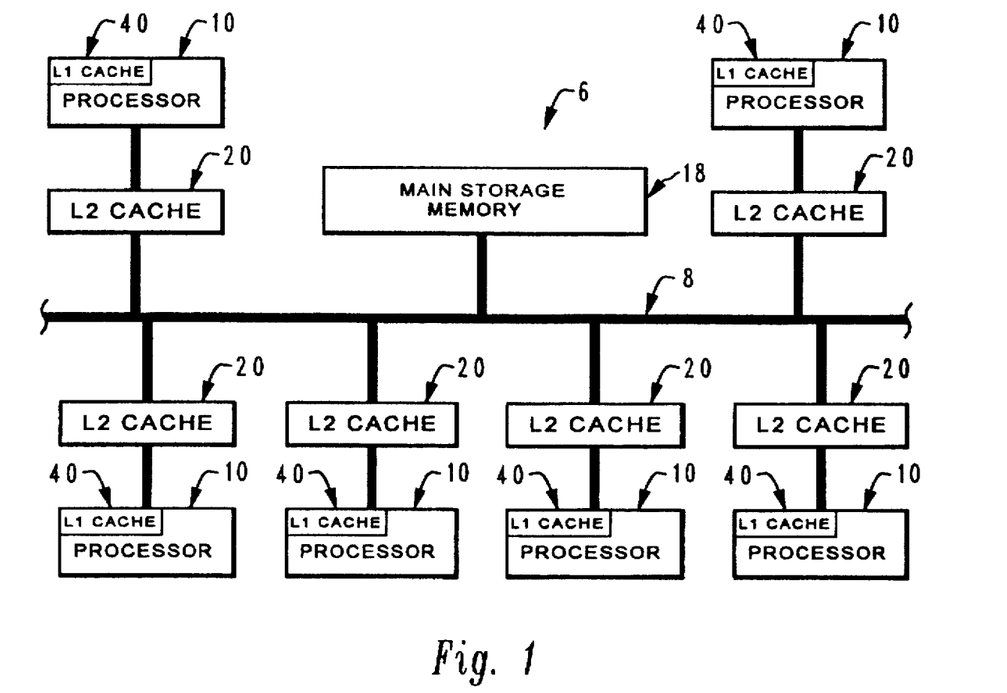
FIG. 1 is a high level block diagram depicting a multiprocessor data processing system which may be utilized to implement the method and system of the present invention.

With reference now to the figures and in particular with reference to FIG. 1, there is depicted a high level block diagram illustrating a multiprocessor data processing system 6 which may be utilized to implement the method and system of the present invention. As illustrated, multiprocessor data processing system 6 may be constructed utilizing multiscalar processors 10 which are each coupled to system memory 18 utilizing bus 8. In a tightly-coupled symmetric multiprocessor system, such as multiprocessor data processing system 6, each processor 10 within multiprocessor data processing system 6 may be utilized to read from and write to memory 18. Thus, systems and interlocks must be utilized to ensure that the data and instructions within memory 18 remain coherent.

As illustrated within FIG. 1, and as will be explained in greater detail herein, each processor 10 within multiprocessor data processing system 6 includes a level 1 (L1) cache memory 40 which may be utilized to efficiently and temporarily access and store selected instructions or data from system memory 18 via level two (L2) cache memory 20. In view of the fact that each cache memory constitutes a memory space, it is important to maintain coherency among each L1 cache memory 40 and L2 cache memory 20 within multiprocessor data processing system 6 in order to assure accurate operation thereof.

Figure 2:
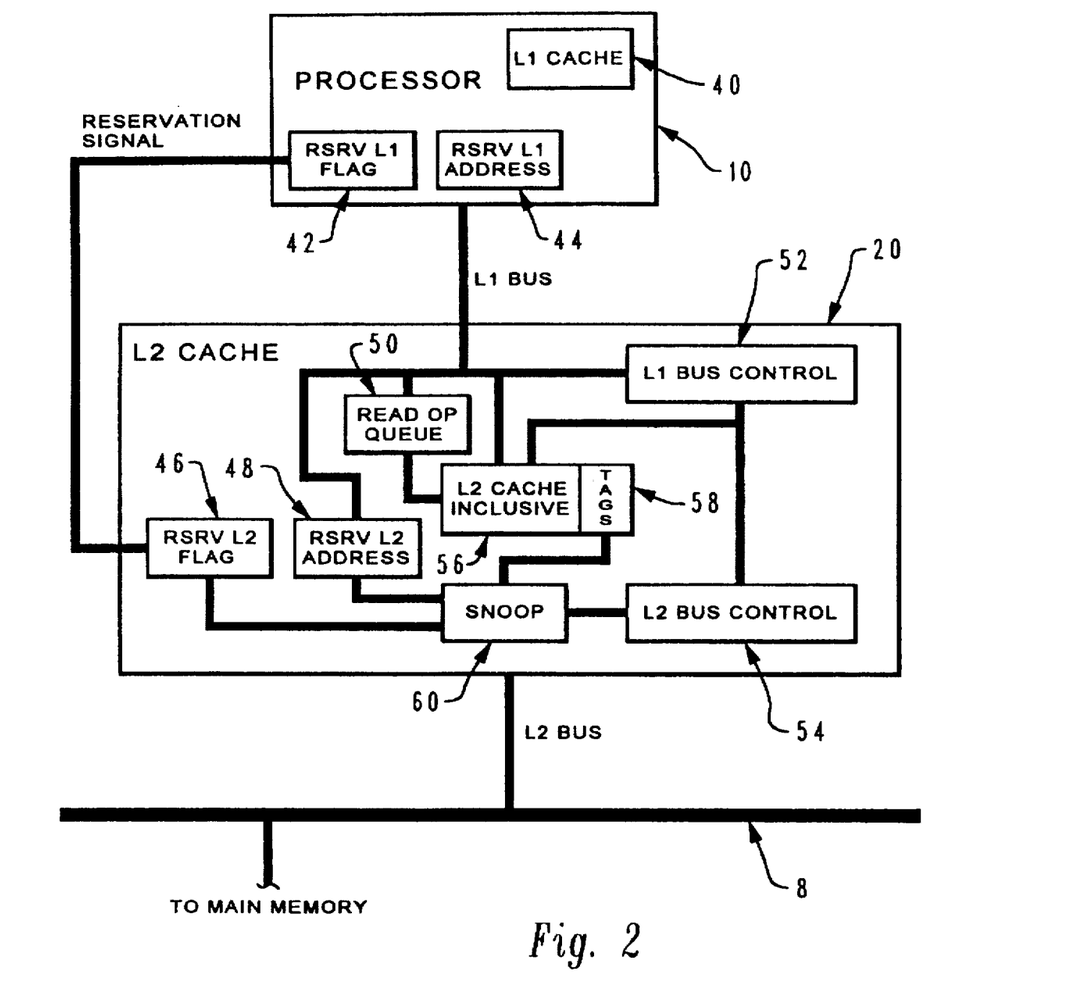
FIG. 2 is a high level block diagram of a multilevel cache system within the multiprocessor data processing system of FIG. 1, which may be utilized to implement the method and system of the present invention.

Referring now to FIG. 2, there is depicted a high level block diagram of a multilevel cache system within multiprocessor data processing system 6 of FIG. 1, which may be utilized to implement the method and system of the present invention. As illustrated, processor 10 is coupled to bus 8 via a level two (L2) cache 20. Level one (L1) cache 40 within processor 10 is utilized to temporarily store a small number of instructions or data which are utilized by processor 10 most frequently. The sizing and operation of cache memories is a well recognized specialty within the data processing art and is not addressed here.

In accordance with an important feature of the present invention, each time an atomic memory reference is attempted within processor 10, a reservation flag 42 is set within processor 10. Those skilled in the art will appreciate that this may simply constitute a single binary digit which is set to a value of either zero or one. This reservation signal is communicated to level two (L2) cache 20 and stored within a L2 reservation flag 46 therein. The setting of this reservation flag within the level two (L2) cache permits an indication that a valid reservation is pending within processor 10. In order to achieve an atomic memory reference it will thus be necessary to advise processor 10 of any attempted writes to data which may occur at the reservation address.

A straightforward technique for accomplishing this filtering would be the transmittal from processor 10 to level two (L2) cache 20 of the reservation address; however, those skilled in the art will appreciate that this will constitute a severe degradation in processor performance. Thus, the address for which the reservation is pending, for cacheable data, is only maintained at reservation address 44 within processor 10. In a manner which will be explained in greater detail herein, level two (L2) cache 20 may be utilized to monitor the activities of other processors within multiprocessor data processing system 6 by means of the so-called "snoop" protocol, graphically depicted at reference numeral 60. By "snooping" bus 8, level two (L2) cache 20 may transmit to processor 10 those attempted bus activities which may alter data at a reservation address.

Of course, certain data within multiprocessor data processing system 6 may be cache "inhibited," that is, data which may not be stored within cache memory. In such a circumstance the setting of a reservation flag for that data will necessarily result in a "miss" within level one (L1) cache 40 and an attempted read of that data from level two (L2) cache 20. In view of the fact that the data is cache inhibited, the address will be passed to level two (L2) cache 20 for a read operation and thus, the monitoring of activities which may alter the data at the reservation address is a simple affair, in the case of cache inhibited data. In such a situation, the reservation address may be transmitted from processor 10 to reservation address 48 within level two (L2) cache 20. Thereafter, snoop protocol 60 may be simply utilized to monitor activities of the other processors within multiprocessor data processing system 6 which may alter the data at that reservation address.

As depicted within FIG. 2, level two (L2) cache 20 also preferably includes a read operation queue 50 which may be utilized to temporarily store read operations passed from level one (L1) cache 40 to level two (L2) cache 20. Additionally, level one (L1) bus control 52 and level two (L2) bus control 54 may be utilized to control the communication of data between level one (L1) cache 40 and level two (L2) cache 20 and level two (L2) cache 20 and bus 8, respectively.

Figure 3:
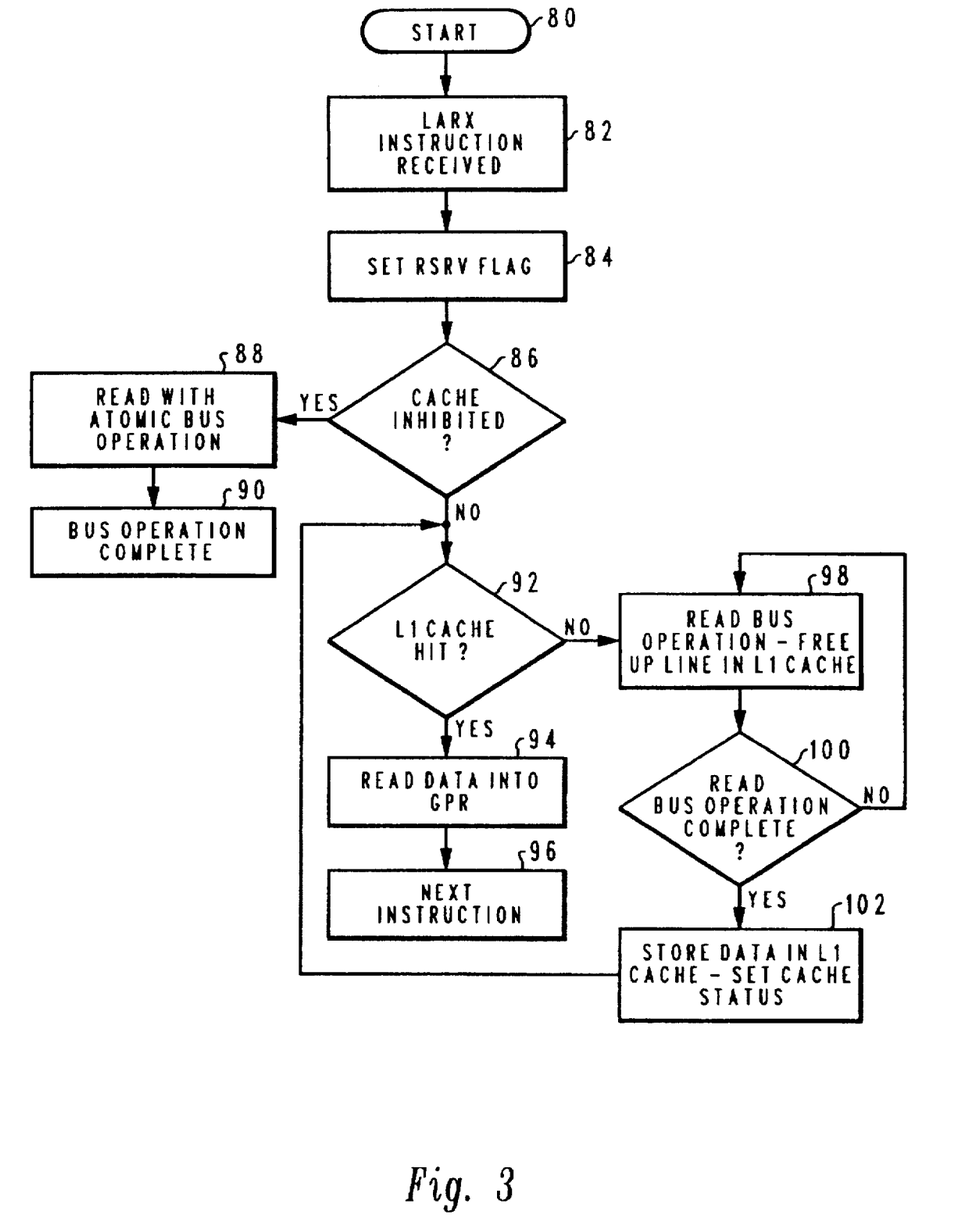
FIG. 3 is a high level logic flowchart which illustrates processing a "Load and Reserve" (LARX) instruction in accordance with the method and system of the present invention.

With reference now to FIG. 3, there is depicted a high level logic flowchart which illustrates the processing of a Load and Reserve (LARX) instruction in accordance with the method and system of the present invention. As described above, a Load and Reserve (LARX) instruction is utilized to load data from a specific location while reserving that address to subsequently store the data, following modification or updating. As illustrated, this process begins at block 80 and thereafter passes to block 82. Block 82 illustrates the reception of a Load and Reserve (LARX) instruction. Next, the process passes to block 84. Block 84 illustrates the setting of the reserve (RSRV) flag. As described above, this flag is utilized to indicate the existence of a valid pending reservation within the system. The L2 reservation flag is also then set within the level two (L2) cache.

Next, the process passes to block 86. Block 86 illustrates a determination of whether or not the data entry against which the Load and Reserve (LARX) instruction has been received is cache inhibited. If so, the process passes to block 88. Block 88 illustrates the reading of that data, utilizing an atomic bus operation. That is, the reading and modification of that data while reserving the address for a subsequent conditional store operation, in the event the data has not been modified by another processor during the intervening period. Thereafter, the process passes to block 90, which illustrates the completion of the bus operation.

Referring again to block 86, in the event the data entry to which the Load and Reserve (LARX) instruction is directed is not cache inhibited, the process passes to block 92. Block 92 illustrates a determination of whether or not that entry was found within the level one (L1) cache. If so, the process passes to block 94. Block 94 illustrates the reading of that data into a General Purpose Register (GPR) and the process then passes to the next instruction, as depicted at block 96.

Referring again to block 92, in the event the data entry was not present within the level one (L1) cache, the process passes to block 98. Block 98 illustrates a read bus operation and the freeing up of a line within the level one (L1) cache. Those skilled in the art will appreciate that many protocols exist for determining what data should be deleted from a cache in view of the requirement that new data be loaded. Typically data lines are freed up based upon a Least Recently Utilized (LRU) protocol. Next, the process passes to block 100. Block 100 illustrates a determination of whether or not the read bus operation is complete and, if not, the process returns, in an iterative fashion, to block 98 to continue the processing of the read operation. Still referring to block 100, upon the completion of the read bus operation the process passes to block 102. Block 102 illustrates the storing of that data within the level one (L1) cache and the setting of the cache status for that data. The process then returns to block 92, in an iterative fashion, to determine whether or not the data entry required is now present within the level one (L1) cache.

Figure 4:
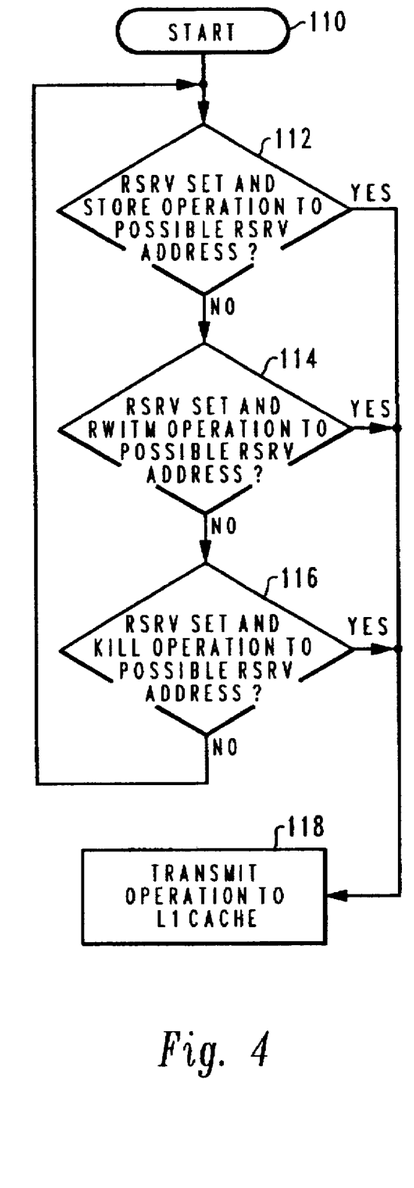
FIG. 4 is a high level logic flowchart which illustrates a filter process at a level two (L2) cache which may be utilized to reset a reservation flag in accordance with the method and system of the present invention.

Referring now to FIG. 4, there is depicted a high level logic flowchart which illustrates a filter process at a level two (L2) cache within multiprocessor data processing system 6 which may be utilized to reset a reservation flag, in accordance with the method and system of the present invention. As depicted, the process begins at block 110. Thereafter, the process passes to block 112. Block 112 illustrates a determination of whether or not the reservation flag is set, indicating the existence of a valid pending reservation within the level one (L1) cache and a determination of whether or not a Store operation has been detected on bus 8 to a possible reservation address. By enforcement of the so-called "inclusion" feature within multiple level caches, any Store operation to an entry present within the level two (L2) cache may be directed to an entry within the level one (L1) cache associated with the level two (L2) cache. Thus, the detection of a store operation to any address within the level two (L2) cache results in the process passing to block 118, which depicts the transmitting of that operation to the level one (L1) cache for a determination of whether or not that Store operation is to be accomplished against a reservation address.

In a similar fashion, in the event a Store operation is not detected, the process passes to block 114. Block 114 once again determines whether or not the reservation flag has been set, indicating the existence of a valid pending reservation and whether or not a Read With Intent To Modify (RWITM) operation to a possible reservation address has occurred. Similarly, block 116 depicts a determination of whether or not the reservation flag has been set and a Kill operation to a possible reservation address has been detected. In the event the reservation flag has been set and either a Read With Intent To Modify (RWITM) operation, or a Kill operation has been detected, the process once again passes to block 118, which illustrates the transmitting of that operation to the level one (L1) cache. Following block 116, the process merely returns to block 112, in an iterative fashion, to continue to monitor bus operations on bus 8 for those operations which may alter a possible reservation address.

Figure 5:
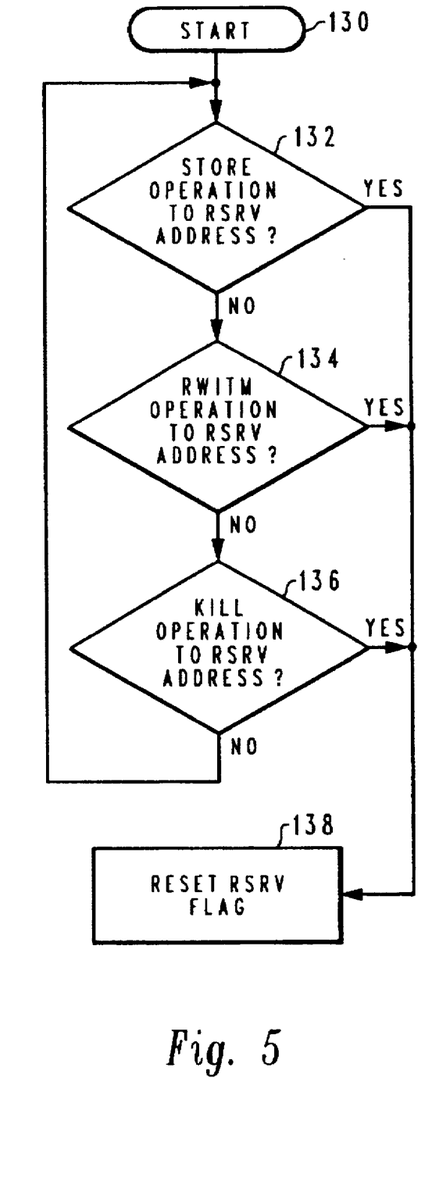
FIG. 5 is a high level logic flowchart which illustrates a filter process at a level one (L1) cache which may be utilized to reset a reservation flag in accordance with the method and system of the present invention.

With reference now to FIG. 5, there is depicted a high level flowchart which illustrates a filter process at a level one (L1) cache, which may be utilized to reset a reservation flag, in accordance with the method and system of the present invention. In a manner similar to that depicted within FIG. 4, this process begins at block 130 and thereafter passes to block 132. Blocks 132, 134, and 136 all depict a determination of whether or not a Store, Read With Intent To Modify (RWITM) or Kill operation has occurred with respect to a reservation address. In the event any of the listed operations has occurred, indicating an alteration of data within the reservation address, the process passes to block 138. Block 138 illustrates the resetting of the reservation flag. Those skilled in the art will appreciate that a subsequent store conditional (STCX) instruction, which would otherwise complete the atomic memory reference will not occur if the reservation flag has been reset. In such a situation, as will be explained in greater detail herein, the Load and Reserve (LARX) instruction will be re-executed in an attempt to achieve the atomic memory reference. Still referring to FIG. 5, the process continues in an iterative fashion monitoring those activities forwarded to the level one (L1) cache from the level two (L2) cache to determine whether or not any of those bus operations will necessitate the resetting of the reservation flag.

Figure 6:
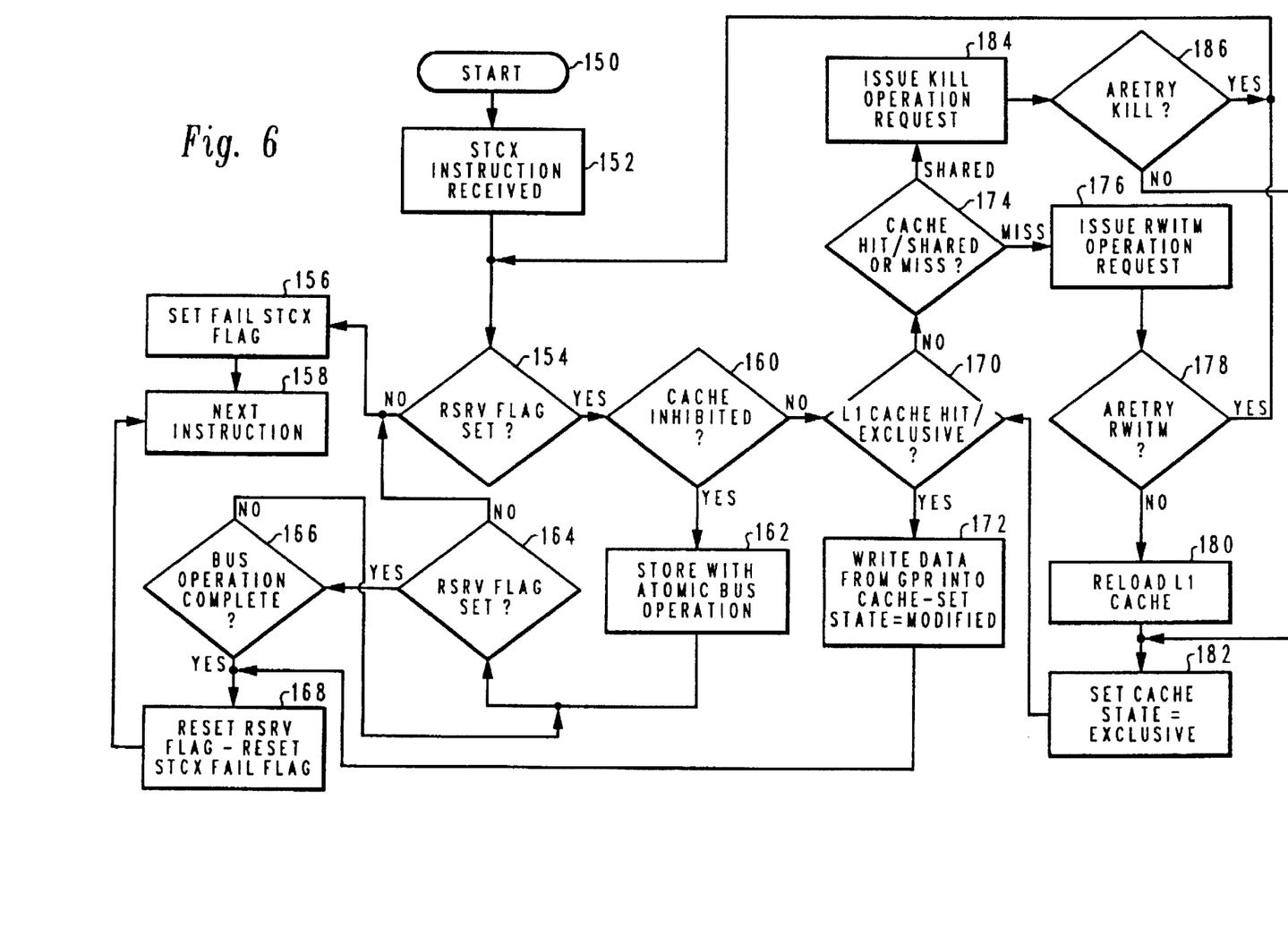
FIG. 6 is a high level logic flowchart which illustrates processing a "Store Conditional" (STCX) instruction in accordance with the method and system of the present invention.

Referring now to FIG. 6, there is depicted a high level logic flowchart which illustrates the processing of a Store Conditional (STCX) instruction in accordance with the method and system of the present invention. As described above, a Store Conditional (STCX) instruction is utilized to determine whether or not the reservation flag is still set, and if so, allows the Store to complete to the reservation address. If the reservation flag is not set, that is, it was reset as a result of snooped bus traffic which involved a write operation hit against the reservation address, the Store is not permitted to complete and a bit is set within a condition register. Typically, a branch instruction follows a LARX/STCX pair and checks the condition register bit to see whether or not the Store succeeded. If not, the branch will result in a loop within the code, back to the Load and Reserve (LARX) instruction for a retry.

As depicted within FIG. 6, this process begins at block 150. Thereafter, the process passes to block 152. Block 152 illustrates a determination of whether or not a Store Conditional (STCX) instruction has been received. If so, the process passes to block 154. Block 154 illustrates a determination of whether or not the reservation flag is set. If not, indicating that some intervening write operation has occurred, with respect to the reservation address, the process passes to block 156. Block 156 illustrates the setting of the failed Store Conditional (STCX) instruction flag and the process then passes to block 158. Block 158 illustrates the occurrence of the next instruction, typically a branch which will examine the state of the attempted atomic memory reference.

Still referring to block 154, in the event the reservation flag is still set, the process passes to block 160. Block 160 illustrates a determination of whether or not the data at the reservation address is cache inhibited. If so, the store occurs with an atomic bus operation, as depicted at block 162. Next, the process passes to block 164. Block 164 illustrates a determination of whether or not the reservation flag is still set, and if not, the process returns in an iterative fashion to block 156. Alternately, if the reservation flag is still set the process passes to block 166. Block 166 illustrates a determination of whether or not the bus operation has completed and if not, the process returns, in an iterative fashion, to block 164 to once again determine whether or not the reservation flag remains set. Thus, the storing of cache inhibited data to a reservation address, by means of an atomic bus operation, will result in the continual determination of whether or not the reservation flag remains set, until such time as the bus operation has completed.

Still referring to block 166, once the bus operation has completed, the process passes to block 168. Block 168 illustrates the resetting of the reservation flag and the resetting of the Store Conditional (STCX) instruction fail flag. The process then passes to the next instruction, as depicted at block 158.

Referring once again to block 160, in the event the reservation address associated with the Store Conditional (STCX) instruction is not cache inhibited, the process passes to block 170. Block 170 illustrates a determination of whether or not the data entry corresponding to the reservation address is a "hit" within the level one (L1) cache and is exclusively owned by the initiating processor. If so, the process passes to block 172. Block 172 illustrates the writing of data from the General Purpose Register (GPR) into the cache and the setting of the cache state for that data to "modified." Thereafter, the process returns to block 168 which illustrates the resetting of the reservation flag and the Store Conditional (STCX) instruction fail flag.

Referring again to block 170, in the event the data corresponding to the reservation address is not present within the level one (L1) cache and exclusively owned by the initiating processor, the process passes to block 174. Block 174 illustrates a determination of whether or not the cache state for the data is "shared" or, whether the data is absent from the level one (L1) cache. In the event the data is not present within the level one cache (L1) cache, the process passes to block 176.

Block 176 illustrates the issuance of a Read With Intent To Modify (RWITM) operation request on the bus. Those skilled in the art of multiprocessor data processing systems will appreciate that data coherency requires that any attempt to modify data by a processor requires that processor to issue a bus operation request indicating an intent to modify that data and other processors within the system then generate a selected signal, if the intended modification is violative of data coherency. The Address Retry (ARETRY) signal is typically utilized by other processors within the system to indicate that a data coherency problem exists and, block 178 illustrates a determination of whether or not an ARETRY of the Read With Intent To Modify (RWITM) request has occurred. If so, the process returns to block 154, in an iterative fashion, to once again determine whether or not the reservation flag remains set.

Still referring to block 178, in the event no other processor within the system issues an ARETRY to the Read With Intent To Modify (RWITM) request the process passes to block 180. Block 180 illustrates the reloading of the level one (L1) cache with the desired data and the process then passes to block 182. Block 182 illustrates the setting of the cache state for that data to "exclusive" and the process then returns, in an iterative fashion, to block 170. Those skilled in the art of cache memory management will appreciate that many protocols exist for defining the state of data within the cache. Typically, a four state protocol referred to as "MESI" is utilized to indicate the state of data as either "modified," "exclusive," "shared," or "invalid."

Having returned to block 170, the process once again determines whether or not the desired data is present within the level one (L1) cache and is "exclusive" to the initiating processor. Having set the state of that data to "exclusive" following the reload of the level one (L1) cache, the process then follows the path previously described through block 172.

Referring again to block 174, in the event the data within the level one (L1) cache is present and is shared, the process passes to block 184. Block 184 depicts the issuance of a "Kill" bus operation request. A "Kill" bus operation request constitutes a request by the initiating processor to invalidate all alternate copies of the data and thus assure exclusive ownership of that data for the initiating processor. In a manner similar to that described above, multiprocess data processing system 6 requires other processors within the system to assert an address retry (ARETRY) in response to the Kill operation request, if that operation will result in a violation of data coherency. If ARETRY has been asserted, the process returns to block 154 to determine whether or not the reservation flag is still set and to repeat the process, as described above. Alternately, in the event no other processor within the system asserts ARETRY to the Kill operation request, the process passes to block 182. Block 182 illustrates the setting of the cache state for that data to "exclusive" within the initiating processor and the process returns to block 170, in an iterative fashion.

Figure 7:
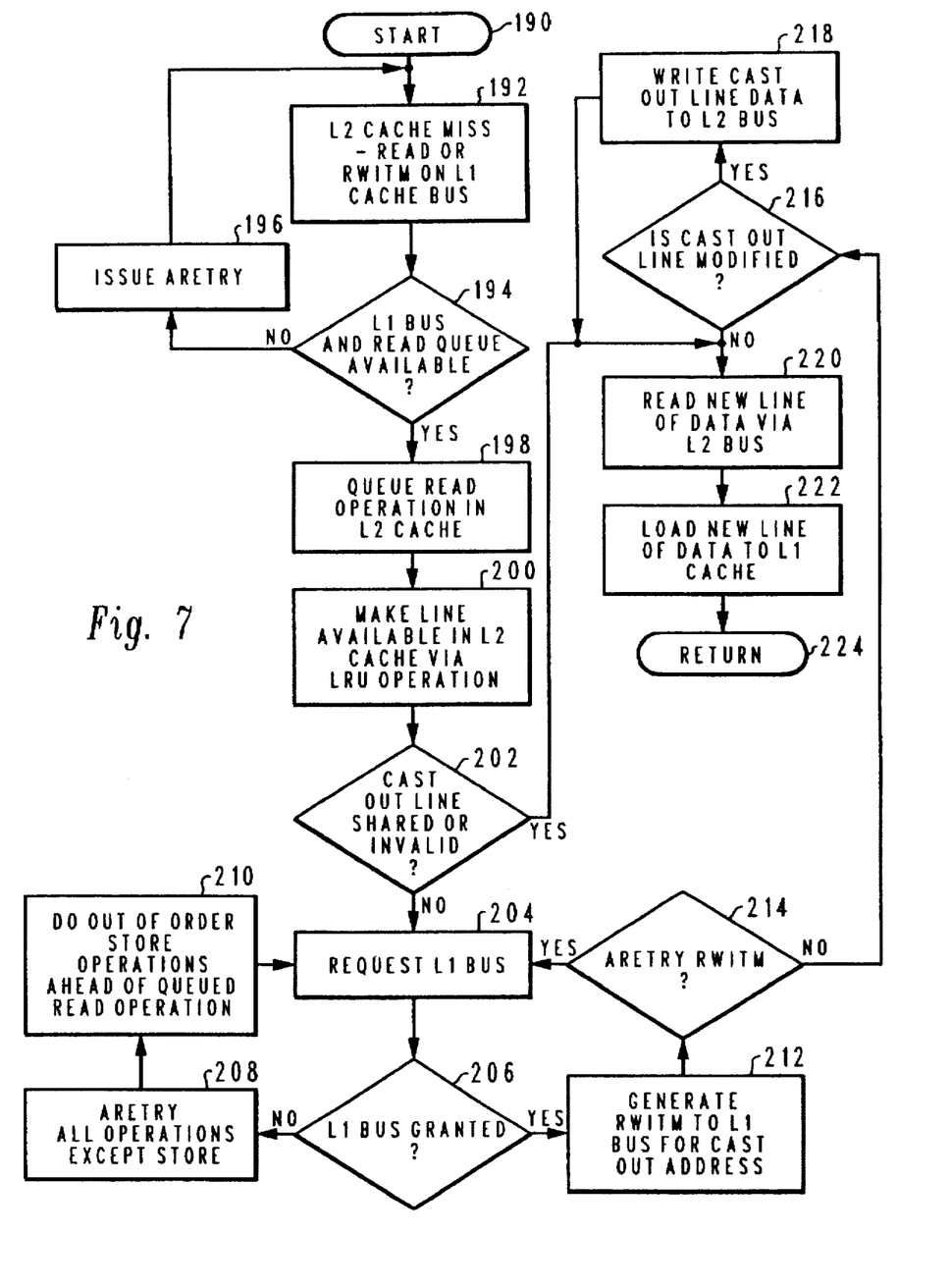
FIG. 7 is a high level logic flowchart which illustrates a process for controlling multilevel cache system filtering of bus traffic in accordance with the method and system of the present invention.

Finally, with reference to FIG. 7, there is depicted a high level logic flowchart which illustrates a process for controlling multilevel cache system filtering of bus traffic, in accordance with the method and system of the present invention. As illustrated, the process begins at block 190. Thereafter, the process passes to block 192, which depicts the occurrence of a level two (L2) cache miss and the issuance of a read or Read With Intent To Modify (RWITM) on the level one (L1) cache bus. Those having skill in the art will appreciate that this will occur as a result of a "miss" within the level one (L1) cache. In situations in which the desired data is present within the level two (L2) cache no problem with multilevel cache filtering will arise, since the level two (L2) cache continually filters those bus operations which affect addresses which correspond to data entries within the level two (L2) cache. However, in the event the desired data is not present within the level two (L2) cache it is possible that an atomic memory reference may not occur properly. Thus, the process passes to block 194. Block 194 illustrates a determination of whether or not the level one (L1) bus is available and the read queue associated with the level two (L2) cache is also available. If not, the process passes to block 196, which illustrates the issuance of an address retry (ARETRY) by the level two (L2) cache and the process returns in an iterative fashion to block 192.

Still referring to block 194, in the event the level one (L1) bus and read queue are available, the process passes to block 198. Block 198 illustrates the queuing of the read operation within the level two (L2) cache. Next, the process passes to block 200. Block 200 illustrates the creation of an available line within the level two (L2) cache via an appropriate protocol, such as a Least Recently Utilized (LRU) operation. Thereafter, the process passes to block 202. Block 202 illustrates a determination of whether or not the line within the level two (L2) cache, which is to be cast out of that cache, is "shared" or "invalid." Of course, in the event a line of data within the level two (L2) cache is "shared" or "invalid," the initiating processor does not maintain exclusive ownership of that line and the casting out of that line of data will not result in a coherency problem for an atomic memory reference, since exclusive ownership of the line will be necessary to achieve the desired memory reference. Thus, in the event the line to be cast out of the level two (L2) cache is not "shared" or "invalid," the process passes to block 204.

Block 204 illustrates the requesting of the level one (L1) bus. Next, the process passes to block 206. Block 206 illustrates a determination of whether or not the level one (L1) bus has been granted and if not, the process passes to block 208. Block 208 illustrates the generation of an address retry (ARETRY) for all operations other than Store operations. The process then passes to block 210 which depicts the accomplishment of all out of order Store operations ahead of the queued Read operation. The process then returns to block 204, in an iterative fashion, to once again request the level one (L1) bus.

Referring again to block 206, in the event the level one (L1) bus has been granted, the process passes to block 212. Block 212 illustrates an attempt by the initiating processor to obtain exclusive ownership of the line which is to be cast out of the level two (L2) bus by the generation of a Read With Intent To Modify (RWITM) request to the level one (L1) bus, for the cast out address. Thereafter, the process passes to block 214. Block 214 illustrates a determination of whether or not an address retry (ARETRY) has been issued with respect to the request for a Read With Intent To Modify (RWITM) and if so, the process returns to block 204, in an iterative fashion, until such time as exclusive ownership of the cast out address has been obtained.

Still referring to block 214, in the event an address retry (ARETRY) with respect to the Read With Intent To Modify (RWITM) has not been issued, the process passes to block 216. Block 216 illustrates a determination of whether or not the cast out line has been "modified." If so, the process passes to block 218. Block 218 illustrates the writing of that cast out line data to the level two (L2) bus. In the event the cast out line was not "modified," or, alternately, after writing the cast out line data to the level two (L2) bus, or in the event the cast out line was "shared" or "invalid," as determined at block 202, the process passes to block 220. Block 220 illustrates the reading of the new line of data via the level two (L2) bus and thereafter, the process passes to block 222. Block 222 illustrates the loading of the new line of data to the level one (L1) cache and the process then passes to block 224 and returns.

Upon reference to the foregoing those skilled in the art will appreciate that the Applicants herein have created a novel method and system for achieving atomic memory references in a multilevel cache data processing system which does not require the distribution of a reservation address throughout the cache system. By setting a single bit reservation flag and monitoring bus traffic for those activities which may write to a possible reservation address, the method and system of the present invention permits the reservation state to be maintained utilizing a technique which enforces a special relationship between each level of cache within the multilevel system.

While the invention has been particularly shown and described with reference to a preferred embodiment, it will be understood by those skilled in the art that various changes in form and detail may be made therein without departing from the spirit and scope of the invention.

We claim:

1. A method for achieving an atomic memory reference in a multiprocessor data processing system which includes multiple processors linked together via a common bus, each processor including multiple inclusive levels of cache, said method comprising the steps of:

setting a reservation flag within each level of cache associated with a selected processor in response to a pending atomic memory reference to a selected address by said selected processor;

deleting any cache data entry within an included level of cache in response to a replacement of a corresponding cache data entry in a higher level of cache;

detecting at a first level of cache each bus operation on said common bus which affects a cache data entry within said first level of cache;

notifying all included levels of cache above said first level of cache of each of said detected bus operations;

resetting said reservation flag in response to an occurrence of either a bus operation affecting said selected address or a deletion of a cache data entry corresponding to said selected address; and prohibiting completion of said pending atomic memory reference in response to said resetting of said reservation flag.

2. The method for achieving an atomic memory reference in a multiprocessor data processing system according to claim 1, wherein said step of setting a reservation flag within each level of cache associated with a selected processor in response to a pending atomic memory reference to a selected address by said selected processor comprises the step of setting a reservation bit within each level of cache associated with a selected processor in response to a pending atomic memory reference to a selected address by said selected processor.

3. The method for achieving an atomic memory reference in a multiprocessor data processing system according to claim 1, wherein said step of deleting any cache data entry within an included level of cache in response to a replacement of a corresponding cache data entry in a higher level of cache comprises the step of issuing a read within intent to modify (RWITM) instruction for any cache data entry within an included level of cache in response to a replacement of a corresponding cache data entry in a high level of cache.

4. A system for achieving an atomic memory reference in a multiprocessor data processing system which includes multiple processors linked together via a common bus, each processor including multiple inclusive levels of cache, said system comprising:

means for setting a reservation flag within each level of cache associated with a selected processor in response to a pending atomic memory reference to a selected address by said selected processor;

means for deleting any cache data entry within an included level of cache in response to a replacement of a corresponding cache data entry in a higher level of cache;

means for detecting at a first level of cache each bus operation on said common bus which affects a cache data entry within said first level of cache;

means for notifying all included levels of cache above said first level of cache of each of said detected bus operations;

means for resetting said reservation flag in response to an occurrence of either a bus operation affecting said selected address or a deletion of a cache data entry corresponding to said selected address; and means for prohibiting completion of said pending atomic memory reference in response to said resetting of said reservation flag.

5. The system for achieving an atomic memory reference in a multiprocessor data processing system according to claim 4, wherein said means for setting a reservation flag within each level of cache associated with a selected processor in response to a pending atomic memory reference to a selected address by said selected processor includes means for setting a reservation bit within each level of cache associated with a selected processor in response to a pending atomic memory reference to a selected address by said selected processor.

6. The system for achieving an atomic memory reference in a multiprocessor data processing system according to claim 4, wherein said means for deleting any cache data entry within an included level of cache in response to a replacement of a corresponding cache data entry in a higher level of cache includes means for issuing a read within intent to modify (RWITM) instruction for any cache data entry within an included level of cache in response to a replacement of a corresponding cache data entry in a high level of cache.

* * * * *